United States Patent Office 3,363,941
Patented Jan. 16, 1968

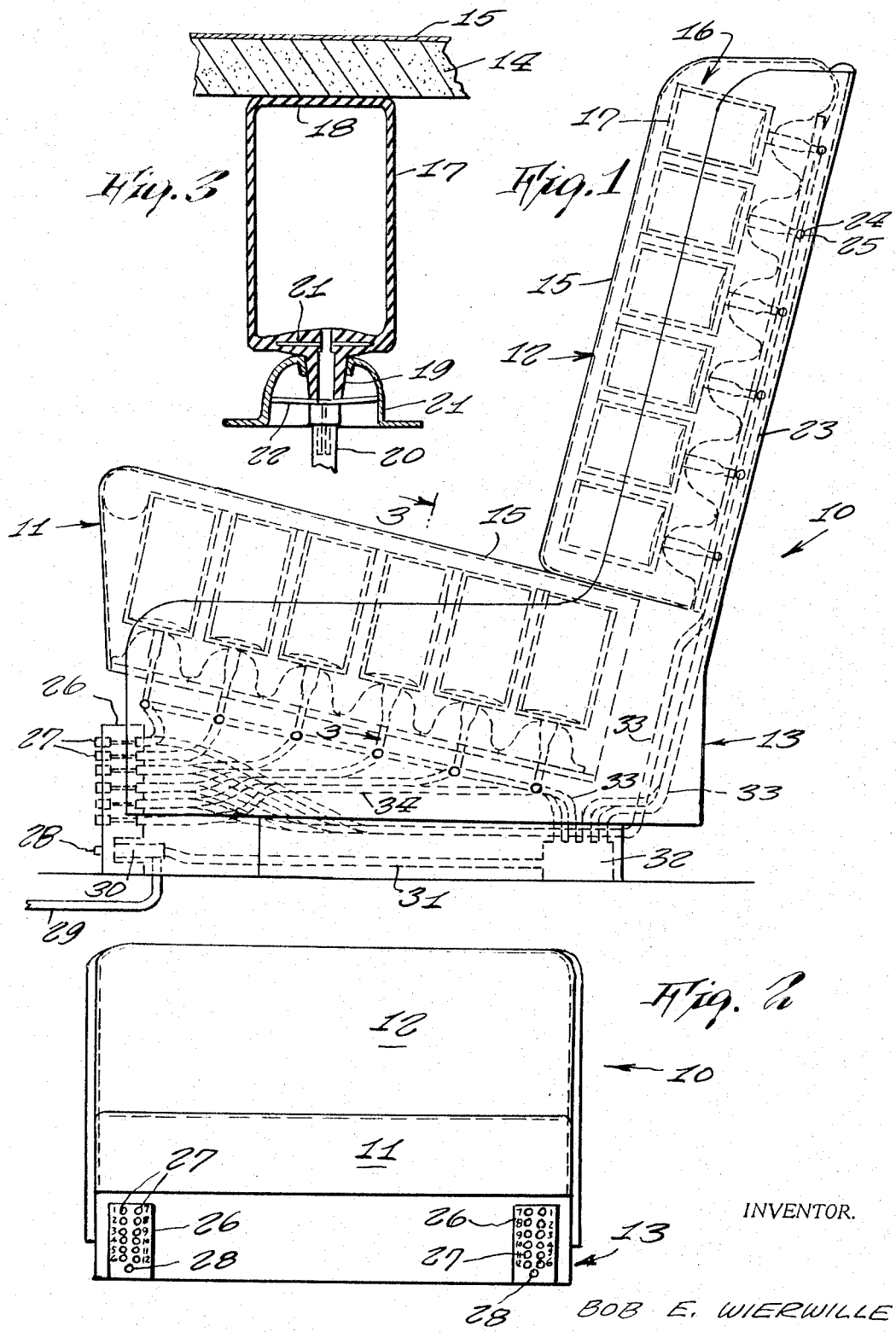

3,363,941
AIR INFLATED AUTOMOBILE SEAT
Bob E. Wierwille, New Knoxville, Ohio, assignor to
The Way, Inc., Van Wert, Ohio
Filed May 16, 1966, Ser. No. 550,372
1 Claim. (Cl. 297—284)

ABSTRACT OF THE DISCLOSURE

An automobile seat and back rest which may be selectively air inflated to a desired pressure of varied amounts in different areas, the pressure being controlled by separate intake and exhaust valve buttons located upon control panel, located on each side of the seat.

This invention relates generally to seats. More specifically it relates to seats for vehicles and more particularly to seats for use in automobiles.

A principal object of the present invention is to provide an air inflated seat for automotive use having self contained means for being adjustable to suit individual taste.

Another object of the present invention is to provide an air seat which permits a cool ride due to a breathing action between air tubes located within the seat.

Still another object is to provide an air seat wherein the back rest portion is likewise inflated for purpose of being adjustably comfortable.

Yet another object is to provide an air seat which may be made in any contour or shape as preferred.

A further object is to provide an air seat which is adaptable for any type of vehicle which may be provided with or without an air compressor or with or without an air tank. The seat could be filled with air and being provided with a release button for adjusting the softness thereof, being inflatable again thereafter to a desired hardness by stopping at an air pump of a gasoline filling station. Thus the need for a compressor and elaborate airlines and control panel can be eliminated.

Other objects are to provide an air seat which is relatively simple in design, inexpensive to manufacture, rugged in construction, easy to use and efficient in operation.

These and other objects will be readily evident upon a study of the following specification and the accompanying drawing therein.

FIGURE 1 is a side elevation view of an automotive seat incorporating the present invention, FIGURE 2 is a front elevation view thereof, and FIGURE 3 is an enlarged cross sectional view taken on the line 3—3 of FIGURE 1.

Referring now to the drawing in detail the numeral 10 represents an air seat according to the present invention wherein there is a seat member 11 and a back rest member 12 which are supported upon a seat frame 13.

Both of the seat and back rest members include an air foam cushion 14 covered on its outer side by a seat cover cloth 15, the air foam member being supported upon an air flotation assembly 16 comprised of a plurality of cylindrical configuration flexible rubber air tubes 17. The rubber air tubes are positioned relatively close to each other and arranged in longitudinal and transverse rows, one end 18 of each air tube being adjacent, the air foam 14 and the opposite end of the air tube being provided with a nozzle 19 which is connected to an air hose 20. The nozzle 19 is supported in an air hose 21 which is rigidly affixed to the frame 13. Each of the air tubes is further provided with a fabric reinforcement 22 within the end having the nozzle, and the terminal end of the nozzle is adjacent to a safety lock washer 22 support within the air tube saddle.

Each of the air hoses 21 leading from the nozzle is connected to a line tube to which all the air tubes in one row are connected. The line tubes are in turn connected to a main line 23 extending transversely thereto thereby providing complete communication to all the air tubes. Each row of line tubes 24 may be provided with a spring valve 25 whereby the line tube may be closed off relative to the other tubes as preferred. Accordingly the right and left side of a seat may be preferably thus separated with spring valves so to provide the driver or passenger each their own complete adjustment or controlling air pressure for a softness or hardness of the seat.

A control panel 26 is mounted at the right and left corners of each frame so to provide manual adjustment of air pressures in the air tubes relative to each other. Each control panel is provided with a plurality of seat exhaust buttons 27 each of which is connected to one of the rows of air tubes in the seat as well as in the back rest. Each of the control panels is further provided with a seat inflation button 28 which permits air from an air intake line 29 connected to the control panel to deliver air from a pressured tank not shown, the intake air from the air intake line 29 being delivered through the intake valve 30 on the control panel, then through line 31 to a chamber 32 where a plurality of air intake lines 33 are each connected to one of the rows of air tubes 17. Thus air exhaust lines 34 each of which leads from one of the rows of air tubes and to exhaust valves operated by buttons 27 on the control panel thus afford a complete adjustment of air intake and air exhaust in any part of the seat or back rest.

It is, of course, understood that the air intake line 29 may be made to be connected to an air pressure tank which is filled by an air compressor contained upon the automotive vehicle or the pressure tank may be filled from a conventional air pump located at automobile gas stations.

While various changes may be made in the detail construction it is understood that such changes will be within the spirit and scope of the present invention as is defined in the appended claim.

What I now claim is:

1. In an automobile air seat, the combination of a seat frame, a seat member and a back rest member supported upon said frame, said seat member and said back rest member each having an airfoam cushion covered on its outer side by a seat cloth cover, each of said airfoam cushions being supported upon an air flotation assembly, each of said flotation assemblies selectively inflating or deflating any portion of said seat member or said back rest member, said air flotation assembly comprising a plurality of cylindrical air tubes, said air tubes being arranged in longitudinal and transverse rows, and end wall of each of said air tubes being in abutment with said airfoam cushions and opposite end wall of each of said air tubes having a nozzle, said nozzle being connected to a hose, said hose being connected to a tube line, each of said tube lines being connected to a main line, spring valve selectively opening or closing communication between said tube lines as preferred, said seat frame including a plurality of control panels, each of said control panels controlling a portion of a seat upon which an individual may sit, one of each said control panels being located upon an opposite side of said seat, said control panel including a plurality of exhaust valves, said exhaust valves being in connection with each of said tube lines, separate intake and exhaust valve buttons, said control panels having said intake valve, said intake valve having line communication to each of said tube line, and each of said air tubes being made of resilient rubber or the equivalent.

References Cited

UNITED STATES PATENTS

| | | | |
|---|---|---|---|
| 3,326,601 | 6/1967 | Vanderbilt et al. | 297—456 |
| 542,927 | 7/1895 | Corrigan | 5—348 X |
| 2,136,510 | 11/1938 | Jensen | 5—348 |
| 2,245,909 | 6/1941 | Enfiajian | 5—348 |
| 2,672,183 | 3/1954 | Forsyth | 5—348 |
| 2,691,179 | 10/1954 | Kahn | 5—348 |
| 2,938,570 | 5/1960 | Flajole | 5—349 X |

CASMIR A. NUNBERG, *Primary Examiner.*